106. COMPOSITIONS, COATING OR PLASTIC
98

No. 732,674.

Patented June 30, 1903.

UNITED STATES PATENT OFFICE.

732,674

JOSHUA A. BELL AND LYNN T. LEET, OF MONTREAL, CANADA, ASSIGNORS TO COMPOSITE STONE AND BRICK COMPANY, A CORPORATION OF DELAWARE.

ARTIFICIAL STONE.

SPECIFICATION forming part of Letters Patent No. 732,674, dated June 30, 1903.

Application filed November 10, 1902. Serial No. 130,674. (No specimens.)

*To all whom it may concern:*

Be it known that we, JOSHUA A. BELL and LYNN T. LEET, citizens of Canada, residing at Montreal, Canada, have invented a new and useful Improvement in Artificial Stone, of which the following is a specification.

This invention relates to the manufacture of steam-indurated stone, and is specially designed to produce additional hardness in the material of such stone, which may be used for brick or other structural or ornamental purposes.

One of the most common forms of artificial stone is Portland cement mixed with sand and water with or without slaked lime. In this mixture the proportions are generally one part of Portland cement to two parts of sand and sometimes three parts of sand. It has been found that by making the mixture of sand and Portland cement and steam-indurating the mixture the percentage of Portland cement may be considerably diminished. By such treatment an artificial stone may be made consisting of one part of Portland cement and four parts of sand. We have discovered that by partly steam-indurating such a mixture and then saturating it with water and then completing the steam induration the product will set very much faster, become harder, and the time of steam induration be diminished. To make such a mixture, sand and Portland cement are intimately mixed, enough water or some binding liquid containing silicate of soda, sodium chlorid, hydrochloric acid, or other binding agent being added in quantity sufficient to make the mixture capable of being formed in a mold. The solid ones of these ingredients may also be added in a pulverulent form, after which the mixture is moistened with water in the usual way, so as to become capable of forming in a mold. The mixture is then molded, after which it is steam-indurated for a short time, from two to six hours, at about one hundred and twenty pounds pressure or more. The articles are then saturated with water or a solution of some indurating liquid. This is done either by spraying or by immersion, the latter preferably, without removal from the indurating-chamber by introducing enough liquid into said chamber to cover or flood the articles. The articles remain covered by the liquid for a period of half an hour to an hour, when the flooding liquid is run out of the chamber, after which steam is again admitted and the steam induration is completed, this second period of steam induration lasting from two to fifteen hours. After the steam induration the articles are removed from the indurating-chamber. As thus prepared the articles will immediately be found to be quite hard, the hardness increasing for a considerable time.

In the above composition for sand may be substituted ground slag or other hard similar material. The final steam induration may also be dispensed with. In such a case the articles after saturation with water or solution of indurating liquid are simply dried. Further, the saturation of the articles with water or indurating liquid, either by submersion or spraying, is much prolonged; but even then it takes such a long time for the articles to attain the requisite hardness that this modification or abbreviation of the process is only useful where a sufficient time is available in the manufacture.

We have also discovered that by replacing a portion of the hydraulic cement with lime the percentage of hydraulic cement may not only be very materially decreased, but the product will become harder and the cost will be much reduced. In making this composition we use from one per cent. to ten per cent. of hydraulic cement, with from one per cent. to four per cent. of lime with the sand. To this mixture may be added some additional binding agent—such as sodium chlorid, silicate of soda, hydrochloric acid, an aluminium salt, &c.—this additional binding agent being added in the form of a powder, in the form of a solution, or it may be applied in a vaporized state in the indurating-chamber, according as is found convenient or practicable. After the ingredients have been mixed the procedure is the same as that which has just been described.

With the ingredients in the compositions thus described a suitable mineral coloring material may be added.

For some purposes, such as the manufacture of face-bricks, we find it of advantage to grind the dry ingredients into an impalpable powder before adding a liquid constituent.

In place of covering the articles with water or an indurating liquid after they have been partially steam-indurated the water or the liquid may be applied in the form of a spray to thoroughly saturate the articles, so as to make them ready for the second and final period of steam induration.

When lime is used, it will be found of advantage to steam-slake it in the same chamber in which the steam induration is effected. In such a case the lime is placed in a receptacle located above the point where the water or indurating liquid reaches in covering or flooding the partly-steam-indurated articles.

What we claim as new is—

1. The process of making artificial stone consisting in mixing the constituent ingredients, adding a liquid, forming the mixture into articles of desired shape, partially steam-indurating the same, saturating them with water, removing the water, and then completing the steam induration.

2. The process of making artificial stone consisting in mixing the constituent ingredients, adding a liquid, forming the mixture into articles of desired shape, partially steam-indurating the same, covering them with water, removing the water, and then completing the steam induration.

3. The process of making artificial stone consisting in mixing the constituent ingredients, grinding them into an impalpable powder, adding a liquid, forming the mixture into articles of desired shape, partially steam-indurating the same, saturating them with a liquid, and then completing the steam induration.

4. The process of making artificial stone consisting in mixing the constituent ingredients, adding a liquid, forming the mixture into articles of desired shape, partially steam-indurating the same, covering them with a liquid, removing the liquid, and completing the steam induration.

5. The process of making artificial stone consisting in mixing sand and hydraulic cement, forming the mixture into articles of desired shape, partially steam-indurating the same, saturating them with water and then completing the steam induration.

6. The process of making artificial stone consisting in mixing sand, slaked lime and hydraulic cement, forming the mixture into articles of desired shape, partially steam-indurating the same, saturating them with water, and then completing the steam induration.

7. The process of making artificial stone consisting in mixing sand, slaked lime and hydraulic cement, then adding enough liquid to make the material capable of molding under pressure and effectually set the cement, forming the mixture into articles of desired shape and then steam-indurating the same.

8. The process of making artificial stone consisting in mixing sand and hydraulic cement, forming the mixture into articles of desired shape, partially steam-indurating the same, saturating them with water, and then subjecting them to the action of steam under pressure.

9. The process of making artificial stone consisting in mixing dry sand and dry hydraulic cement in a finely-pulverized state, moistening the mixture with water, forming it into articles of desired shape, subjecting the same to steam under pressure, submerging them with water, removing the water, and then subjecting them to the action of steam under pressure.

10. The process of making artificial stone consisting in mixing sand, hydraulic cement, and a solution of a binding agent, forming the mixture into articles of desired shape, partially steam-indurating the same and then saturating them with water.

11. The process of making artificial stone consisting in mixing sand, hydraulic cement, slaked lime and acidulated water, forming the mixture into articles of desired shape, partially steam-indurating the same, and then saturating them with water.

12. The process of making artificial stone consisting in mixing sand and hydraulic cement, then moistening with a solution of a binding agent, forming the mixture into articles of desired shape, and steam-indurating the same.

13. The process of making artificial stone consisting in mixing sand and hydraulic cement, moistening with a suitable liquid, forming the mixture into articles of desired shape, partially steam-indurating the same, applying water to them, and then completing the steam induration.

14. The process of making artificial stone consisting in mixing sand and hydraulic cement, moistening with a suitable liquid, forming the mixture into articles of desired shape, partially steam-indurating the same, saturating them with water, and then completing the steam induration.

15. The process of making artificial stone consisting in mixing sand, slaked lime, hydraulic cement, and an alkali salt, then adding water to moisten the mixture, forming the mixture into articles of desired shape, and then steam-indurating the same.

16. The process of making artificial stone consisting in mixing sand, hydraulic cement and an alkaline silicate, moistening with water, forming the mixture into articles of desired shape, and then steam-indurating the same.

17. The process of making artificial stone consisting in mixing the constituent ingredients, adding enough moisture to make the particles of the ingredients adhere, forming the mixture into articles of desired shape, partially steam-indurating the same, and then applying water further to increase the hardness of the articles.

18. The process of making artificial stone consisting in mixing the constituent ingredients, adding a liquid, forming into articles of desired shape, partially steam-indurating the same, saturating them with an indurating liquid, removing the liquid and then completing the steam induration.

19. The process of making artificial stone which consists in mixing the constituent ingredients, adding a liquid, forming into articles of desired shape, partially steam-indurating the same, covering them with an indurating liquid, removing the liquid and then completing the steam induration.

20. The process of making artificial stone consisting in mixing sand and hydraulic cement, moistening with a suitable liquid, forming the material into articles of desired shape, partially steam-indurating the same, applying an indurating liquid and then completing the steam induration.

21. The process of making artificial stone consisting in mixing sand and hydraulic cement, moistening with a suitable liquid, forming the material into articles of desired shape, partially steam-indurating the same, covering them with an indurating liquid and then completing the steam induration.

22. The process of making artificial stone consisting in mixing sand, lime, hydraulic cement and an additional binding agent, moistening the mixture, forming the material into articles of desired shape, and then steam-indurating the same.

In testimony whereof we have signed our names to this specification, in the presence of two subscribing witnesses, this 1st day of November, 1902.

JOSHUA A. BELL.
LYNN T. LEET.

Witnesses:
B. F. KEINARD,
JOHN H. GALLAGHER.